J. E. LOUGHRIDGE.
CONNECTING DEVICE FOR VEHICLE DRAFT ATTACHMENTS.
APPLICATION FILED AUG. 7, 1912.
1,051,138.
Patented Jan. 21, 1913.
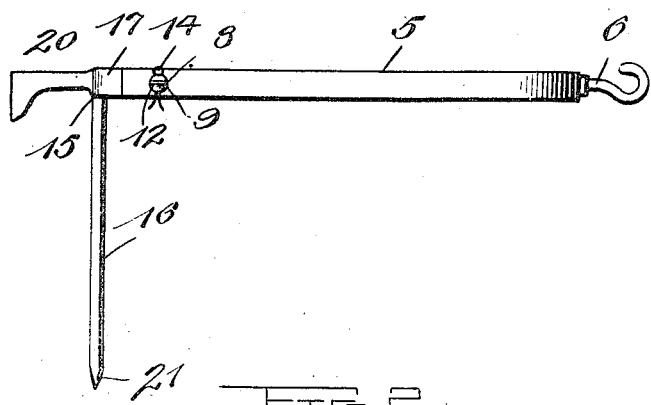
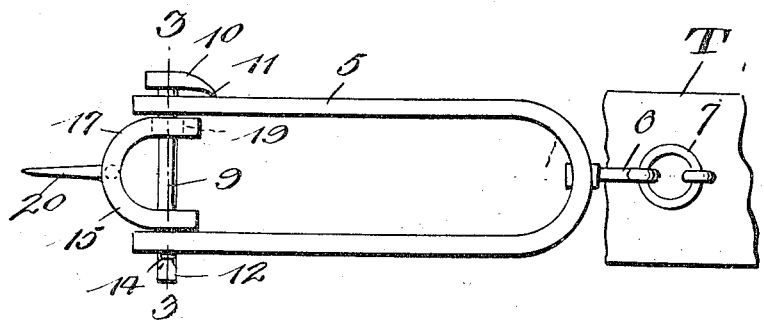
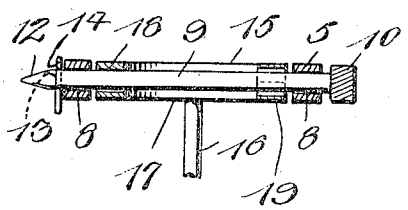
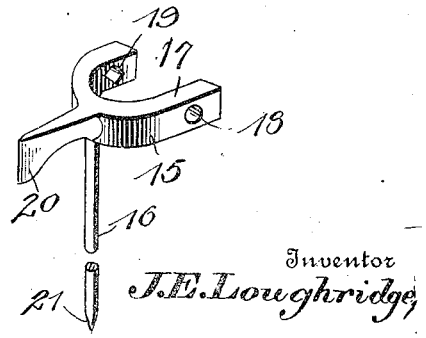
Witnesses
Inventor
J. E. Loughridge,
By Watson E. Coleman
Attorney

UNITED STATES PATENT OFFICE.

JOSEPH E. LOUGHRIDGE, OF TUNNELTON, WEST VIRGINIA.

CONNECTING DEVICE FOR VEHICLE DRAFT ATTACHMENTS.

1,051,138.

Specification of Letters Patent. Patented Jan. 21, 1913.

Application filed August 7, 1912. Serial No. 713,926.

*To all whom it may concern:*

Be it known that I, JOSEPH E. LOUGH-RIDGE, a citizen of the United States, residing at Tunnelton, in the county of Preston and State of West Virginia, have invented certain new and useful Improvements in Connecting Devices for Vehicle Draft Attachments, of which the following is a specification, reference being had to the accompanying drawings.

This invention relates to connecting devices for vehicle draft attachments and has for its primary object to provide a simple, inexpensive and durable device of this character whereby the doubletree may be easily and quickly connected to the tongue of the vehicle.

A further object of the invention is to provide a tool of the above character which consists of comparatively few elements capable of quick assemblage, and which coact to produce a device of great efficiency and durability in practical use.

With the above and other objects in view, the invention consists in the novel features of construction and the combination and arrangement of parts hereinafter more fully described, pointed out in the claims and shown in the accompanying drawings in which, Figure 1 is a side elevation of a device embodying the present invention showing the several parts in assembled relationship. Fig. 2 is a top plan view. Fig. 3 is a section taken on the line 3—3 of Fig. 2. Fig. 4 is a detail perspective view of the combined double tree pin and wrench.

Referring in detail to the drawing 5 designates an elongated U-shaped bar which constitutes a wagon clevis. To the intermediate portion of this bar a hook 6 is swiveled and is adapted for engagement in the eye or hook indicated at 7 fixed to the tongue T of the vehicle. The ends of the clevis bar 5 are provided with cylindrical openings 8 to receive the shank 9 of one of the tool elements. One end of this shank is provided with a hammer head 10 terminating at one end in a claw 11. The other end of the shank 9 is provided with oppositely beveled faces to provide a chisel indicated at 12 and which may also be utilized as a screw-driver. Adjacent to the latter end of the shank 9, the same is provided with a transverse opening 13 to receive a cotter pin 14 whereby the shank is retained in the openings 8 of the clevis bar 5.

The member generally indicated by the numeral 15 serves the purpose of a combined wrench and double-tree pin or bolt and consists of a single integral casting embodying a cylindrical bolt or pin 16 having formed upon one of its ends a laterally extending U-shaped bar 17, the arms of said U-shaped bar being equally spaced from the bolt 16 and adapted for disposal between the ends of the U-shaped clevis bar 5 as shown in Fig. 2. The arms of the U-shaped bar 17 are also provided with openings 18 and 19 respectively, the opening 19 being rectangular to prevent the tool element 15 from turning upon the shank 9 which is disposed through said openings. At the point of juncture of the bolt 16 and the U-shaped bar 17, a laterally extending hatchet head 20 is formed, said hatchet head projecting upon the opposite side of the bolt 16 from the U-shaped bar 17. The lower end of the bolt 16 is tapered or pointed as indicated at 21 and provides a convenient punch for the purpose of perforating leather straps or boring holes in wood. It will be noted that when the doubletree is connected to the tongue of the vehicle by means of my improved attachment, that the same is located upon the pin 16 between the transverse bolt 9 and the point of the hatchet head 20 so that the pull of the doubletree upon the pin 16 will act to force the point of the hatchet head into the vehicle tongue and thereby hold the clevis 5 against lateral swinging movement. It will also be obvious that by means of this construction the arms of the U-shaped bar 17 and the bolt 9 are relieved of considerable strain, thus producing a device which as a whole is very reliable and durable in actual use.

In the use of my invention, the clevis bar 5 is attached to the tongue of the vehicle by means of the bolt 6 and the element 15 arranged between the ends of the arms of said clevis bar in the manner above described. The double-tree is now arranged upon the tongue and the bolt 16 disposed through coinciding openings in said tongue and double-tree, thereby retaining the double tree in position. When it is necessary to tighten the axle nuts of the vehicle, the wrench element 15 may be readily removed and the nut fitted into the square opening 19 in the head of the U-shaped bar 17. The hatchet head 20 provides a convenient handle whereby the tool element may be turned in tightening the nut. Obviously the hammer 10 and hatchet 20 will be frequently employed in making various repairs to the vehicle. It will therefore be seen that I have produced a device which is of great convenience and serviceability in practical use, as the same comprises comparatively few elements which are all of simple form. It will also be appreciated that the device as a whole can be inexpensively produced and is strong, durable and efficient in service.

While I have shown and described the preferred construction and arrangement of the several elements, it will be obvious that the invention is susceptible of considerable modification without departing from the essential features or sacrificing any of the advantages thereof.

What I claim is:—

1. In combination, a U shaped clevis bar having openings in its ends, a cylindrical shank adapted for insertion through said openings and provided with a head upon one of its ends, means to retain the shank in the ends of the clevis bar, and a bolt adapted for insertion through coinciding openings in the tongue and double-tree of a vehicle and provided with integral spaced arms upon one end adapted for disposal between the arms of the U-shaped clevis bar, said spaced arms being provided with openings to receive said shank.

2. In combination, a U-shaped clevis bar provided with an attaching hook at one end, the parallel arms of said bar being provided in their ends with openings, a bolt adapted for insertion through coinciding openings in the tongue and doubletree of a vehicle and provided with a head on one end to be received between the arms of the clevis, said head also having an opening to coincide with the openings in the clevis arms, a cylindrical shank adapted for insertion through said coinciding openings and provided with a head upon one of its ends, and retaining means disposed through an aperture in the other end of said shank to retain the same in the openings of said clevis bar and the head of said bolt.

In testimony whereof I hereunto affix my signature in the presence of two witnesses.

JOSEPH E. LOUGHRIDGE.

Witnesses:
WILLIAM LOUGHRIDGE,
NINA LOUGHRIDGE.